_2,887,501_

PREPARATION OF HIGHER ALKYLATED ALKYL HALOGENOSILANES

Ben A. Bluestein, Schenectady, N.Y., assignor to General Electric Company, a corporation of New York No Drawing. Application December 26, 1956
Serial No. 630,460

4 Claims. (Cl. 260—448.2)

This invention is concerned with a process for preparing silanes containing a plurality of silicon-bonded alkyl groups. More particularly, the invention relates to the preparation of alkyl halogenosilanes containing substantial quantities of trialkyl halogenosilanes as well as tetraalkyl silanes, which comprises effecting reaction at an elevated temperature in the presence of a hydrogen halide between a lower alkyl halide and a mixture of silicon and calcium, wherein the calcium comprises, by weight, from 10 to 80% of the total weight of the calcium and the silicon.

In Rochow Patent 2,380,995, issued August 7, 1945, and assigned to the same assignee as the present invention, there is disclosed and broadly claimed a method of preparing organohalogenosilanes by the reaction of an organic halide and silicon. When an alkyl halide, for instance, methyl chloride, is passed over heated silicon or mixtures of silicon and copper as described in the aforementioned Rochow patent, there is obtained a complex mixture of products containing substantial quantities of methyltrichlorosilane and dimethyldichlorosilane, and trace amounts of trimethylchlorosilane and other higher alkylated silanes such as tetramethylsilane.

Higher alkylated alkyl silanes, such as trimethylchlorosilane, triethylchlorosilane, tetramethylsilane, tetraethylsilane, tripropylbromosilane, etc., are in large demand. Thus, the trimethylhalogenosilanes are useful in the preparation of organopolysiloxane lubricating fluids for chain-stopping purposes, for instance, to form trimethylsiloxy groups at the end of linear organopolysiloxanes employed as lubricating fluids. The preparation of such chain-stopped organopolysiloxanes is more particularly described in Patnode Patents 2,469,888 and 2,469,890, both issued May 10, 1949, and assigned to the same assignee as the present invention.

The tetra-alkyl silanes are desirable because they can be readily redistributed in the presence of suitable catalysts with phenylhalogenosilanes to give the very desirable alkyl phenylhalogenosilanes, which have been found to be an advantageous intermediate in the preparation of high temperature organopolysiloxane resins and lubricating fluids.

The primary object of the present invention is to provide a process for producing mixtures of alkylhalogenosilanes containing substantial quantities of the trialkyl derivative as well as increased amounts of the tetra-alkyl silane.

Another object of the invention is to provide a method for increasing the yield of trialkyl halogenosilanes such as trimethylchlorosilane, trimethylbromosilane, triethylchlorosilane, etc., obtained from the reaction of a lower alkyl halide such as methyl chloride, methyl bromide, ethyl chloride, etc., and silicon preferably in the presence of a metallic catalyst for the silicon-alkyl halide reaction.

Another object of the invention is to obtain increased yields of tetra-alkyl silanes from the reaction of a lower alkyl halide and silicon.

Other objects of the invention will become apparent from the following description thereof.

All the foregoing objects and other advantages can be obtained if an alkyl halide is passed over silicon in contact with calcium in which the calcium comprises from 10–80% of the total weight of the latter and the silicon.

The alkyl halides employed in the present invention may be any one of those employed in making alkyl halogenosilanes. Among these may be mentioned methyl chloride, ethyl chloride, methyl bromide, propyl bromide, etc.

The calcium may be mechanically mixed with the silicon to form a mixed powder in which the particles of the silicon and calcium have average particle size diameters of from 44 to 400 or more microns. Generally, it is desirable for many purposes that at least 90% of the silicon and calcium particles range in average particle size diameter of from 105–250 microns; stated alternatively it is desirable that they have a mesh size of from about 100–200 when sifted through sieves of the United States Standard Sieve Series (ASTM Standard) as is more particularly recited in Gilliam et al. Patent 2,466,413. Alternatively, the calcium and silicon may be employed in the form of an alloy which is then crushed and powdered to the desirable particle size suitable for carrying out the reaction. Whether in the form of mixed powders or as an alloy, the proportion of calcium, by weight, should be within the range of from about 10–80% of the total weight of the calcium and the silicon.

Various promoters for the reaction between the alkyl halide and the mixture of silicon and calcium are advantageously incorporated including copper, zinc, and mixtures of copper and zinc. When employing copper as the promoter it is desirable that the latter comprises, by weight, from about 2 to 20% of the silicon. When using zinc as the promoter (which promoter is more particularly disclosed in Gilliam Patent 2,464,033 issued March 8, 1949), the zinc is advantageously present in an amount equal to from about 0.05 to 0.5%, based on the weight of the silicon.

The temperature at which reaction is effected is advantageously above 250° C. up to the temperature of decomposition of the reactants and reaction products. Temperatures of about 275° to 400° C. are usually preferable from an overall yield viewpoint. Anhydrous conditions are required in order to minimize loss of alkylsilanes due to hydrolysis of the silicon-bonded halogen by moisture in the air.

It has unexpectedly been found that when passing the alkyl halide over the mixture of the silicon and calcium, it is necessary to activate the latter materials before any detectable yields of alkyl halogenosilanes are obtained by passing a hydrogen halide (preferably in the gaseous and anhydrous state) over the metallic powder. Among the hydrogen halides which may be employed are, for instance, hydrogen chloride, hydrogen bromide, etc. It is desirable that the halogen of the hydrogen halide be the same as the halogen of the alkyl halide in order to avoid obtaining alkyl halogenosilanes in which the silicon has attached thereto different halogens. The amount of hydrogen halide used in the reaction will vary depending upon such factors as the concentration of the calcium, temperature of the reaction, presence or absence of promoters, etc. In general, I have found that where the temperature during the course of the reaction is well above 300° C., the amount of hydrogen halide used may vary from about 5–25%, by weight, of the alkyl halide. Where temperatures below 300° C. are employed, care should be exercised that the activation of the calcium-silicon mixture should be effected by the use of adequate amounts of the hydrogen halide. In general, once activation of the calcium-silicon mixture has taken place by passage of the hydrogen halide over the latter mixture (whether it constitutes a mixture of calcium and silicon powders, or an alloy of calcium and silicon), the passage of the hydrogen halide may be discontinued. The passage of the hydrogen halide may occur simultaneously with the passage of the alkyl halide by bringing effluent streams of gasses of the two materials together and passing them simultaneously over the calcium-silicon mixture.

In order that those skilled in the art may better understand how the present invention may be practiced, the following examples are given by way of illustration and not by way of limitation. All parts are by weight.

In the following examples, the calcium and silicon employed were in the form of an alloy crushed to about −60 mesh (average particle size diameter of about 149–250 microns) in which the calcium comprised about 31 percent and the silicon 61 percent of the alloy, the remainder being small amounts of impurities. Anhydrous conditions were maintained throughout.

chloride were used. The following Table I shows the temperature of the reaction, the amounts of methyl chloride and hydrogen chloride used, as well as the yields of the various methyl silanes obtained in the reaction product.

Table I [1]

| Test No. | Temp., °C. | Parts $CH_3Cl$ | Parts HCl | Percent Yields ||||| 
|---|---|---|---|---|---|---|---|---|
| | | | | $(CH_3)_4Si$ | $(CH_3)_3SiCl$ | $(CH_3)_2SiCl_2$ | $CH_3SiCl_3$ | $CH_3SiHCl_2$ |
| 1 | 325 | 31 | 2 | 8.8 | 44.2 | 30.8 | 9.6 | 1.6 |
| 2 | 300 | 91 | 5 | 7.6 | 61.6 | 13.1 | 7.9 | 4.8 |

[1] In the above table, the balance of the reaction product comprised $SiCl_4$, $HSiCl_3$, and small amounts of other silanes.

EXAMPLE 1

In this example 63 parts of the calcium-silicon alloy intimately mixed with 7 parts copper were packed into a steel tube containing means for stirring the powder bed. While maintaining this calcium-silicon bed at a temperature of around 350° to 375° C., a mixture of 29 parts methyl chloride and 9 parts hydrogen chloride was passed through the bed as a mixture of gasses at such a rate that the passage was conducted evenly over a period of about 4.5 hours. The reaction products were collected in a low temperature trap fitted to the reaction tube and condensed by means of a suitable condensing means. Analysis of the reaction product showed that 41 percent was trimethylchlorosilane, 4 percent was tetramethylsilane, 24 percent was dimethyldichlorosilane, and 30 percent was methyltrichlorosilane. This is to be compared with the usual trace amounts, that is, less than 5 percent trimethylchlorosilane obtained when methyl chloride is passed over a similar mixture of copper and silicon in the absence of the calcium and HCl. The 4 percent tetramethylsilane is also considerably higher than would ordinarily be obtained in the absence of the calcium. Usually, only difficultly detectable traces of $(CH_3)_4Si$ are obtained under such conditions.

When the conditions recited in Example 1 were repeated omitting the hydrogen chloride, even after 5 hours of passage of the methyl chloride over the calcium-silicon mixture in the presence of copper, no reaction had taken place as evidenced by the fact that no detectable amounts of products could be found.

In the following example, additional tests were carried out employing in this instance as the bed over which the methyl chloride was passed, a mixture comprising 45 parts of the above-mentioned calcium-silicon alloy in the same particle size, 5 parts finely divided copper powder, and 0.1 part zinc.

EXAMPLE 2

In this example, the above-identified mixture of calcium, silicon, copper and zinc was packed in a reactor similarly as was done in Example 1 and the temperature of the powder bed maintained at around 300 to 325° C. while constantly passing a mixture of methyl chloride and hydrogen chloride for about 5 hours at such a rate that the stipulated amounts of methyl chloride and hydrogen It will of course be apparent to those skilled in the art, that in place of the alkyl halide described above, other alkyl halides many examples of which have been given above, may be employed without departing from the scope of the invention. In place of the alloy of silicon and calcium one may employ mixtures of powders of silicon and calcium as well as other proportions of the calcium and silicon in whatever physical state used. Likewise, the temperatures of reaction and proportions of ingredients may be varied within wide limits without departing from the scope of the invention. At temperatures of from 200–250° C., reaction proceeds much more slowly than at temperatures of around 300–400° C. In addition it will be understood by those skilled in the art, that metallic catalysts other than copper may be employed to accelerate or control the course of the reaction between the alkyl halide and the silicon. Examples of such catalysts in addition to copper, are nickel, tin, antimony, silver, etc. In general, copper is the preferred catalyst for the silicon-calcium-alkyl halide reaction.

What I claim as new and desire to secure by Letters Patent of the United States is:

1. The process for preparing methylchlorosilanes containing substantial quantities of trimethylchlorosilane and tetramethylsilane, which process comprises effecting reaction at an elevated temperature of from 300 to 375° C. in the presence of hydrogen chloride between methyl chloride and a mixture of silicon and calcium where the calcium comprises, by weight, from 10 to 80% of the weight of the calcium and the silicon, said hydrogen chloride being present in an amount equal to from 5 to 25% by weight based on the weight of the methyl chloride.

2. The process as in claim 1, in which catalytic amounts of copper are intermixed with the calcium and the silicon.

3. The process for preparing a mixture of methylchlorosilanes containing substantial quantities of trimethylchlorosilane and tetramethylsilane which process comprises effecting reaction at a temperature of from about 300 to 375° C. in the presence of hydrogen chloride, between methyl chloride and a mixture composed of silicon, calcium, and copper wherein the calcium comprises, by weight, from 10 to 80% of the total weight of the calcium and the silicon and the copper comprises, by weight, from about 2 to 20% of the weight of the silicon, said hydrogen chloride being present in an amount equal to from 5 to 25% by weight based on the weight of the methyl chloride.

4. The process for preparing a mixture of methylchlorosilanes containing substantial quantities of trimethylchlorosilane and tetramethylsilane, which process comprises effecting reaction at an elevated temperature of from 300 to 375° C. in the presence of hydrogen chloride between methyl chloride and a mixture composed of silicon, calcium, copper and zinc wherein the calcium comprises, by weight, from 10 to 80% of the total weight of the calcium and the silicon, the copper comprises, by weight, from about 2 to 20% of the weight of the silicon, and the zinc comprises, by weight, from 0.05 to 0.5% of the weight of the silicon, said hydrogen chloride being present in an amount equal to from 5 to 25% by weight based on the weight of the methyl chloride.

References Cited in the file of this patent

UNITED STATES PATENTS

| | | |
|---|---|---|
| 2,427,605 | Hurd | Sept. 16, 1947 |
| 2,478,493 | Levine | Aug. 9, 1949 |
| 2,483,373 | Rochow | Sept. 27, 1949 |
| 2,488,487 | Barry et al. | Nov. 15, 1949 |

FOREIGN PATENTS

| | | |
|---|---|---|
| 708,823 | Great Britain | May 12, 1954 |
| 1,046,295 | France | July 8, 1953 |

OTHER REFERENCES

"The Iron Age," January 10, 1952, p. 121.